United States Patent [19]
Kuriyama

[11] Patent Number: 5,815,658
[45] Date of Patent: Sep. 29, 1998

[54] PORTABLE TERMINAL APPARATUS FOR IC CARD COMPATIBLE WITH A PLURALITY OF APPLICATIONS

[75] Inventor: Ryouichi Kuriyama, Zushi, Japan

[73] Assignee: Kabushiki Kaisha Toshiba, Kawasaki, Japan

[21] Appl. No.: 791,782

[22] Filed: Jan. 29, 1997

[30] Foreign Application Priority Data

Mar. 25, 1996 [JP] Japan .................................. 8-067962

[51] Int. Cl.⁶ .................................................. G06F 11/34
[52] U.S. Cl. ......................... 395/186; 235/379; 235/380; 235/492
[58] Field of Search ............................ 395/186; 235/379, 235/380, 492

[56] References Cited

U.S. PATENT DOCUMENTS 5,592,819  1/1997  Shona ...................................... 395/186

*Primary Examiner*—Harold Pitts
*Attorney, Agent, or Firm*—Cushman Darby & Cushman IP Group of Pillsbury Madison & Sutro LLP

[57] ABSTRACT

A data processing apparatus for an IC card includes an interface section for receiving and accessing an integrated circuit medium, a first application function for performing data processing for the integrated circuit medium on the basis of the first application, a second application function for performing data processing on the basis of the second application, and a control unit for selecting one of the first and second application functions on the basis of an instruction from a keyboard and controlling it so as to perform data processing.

11 Claims, 5 Drawing Sheets

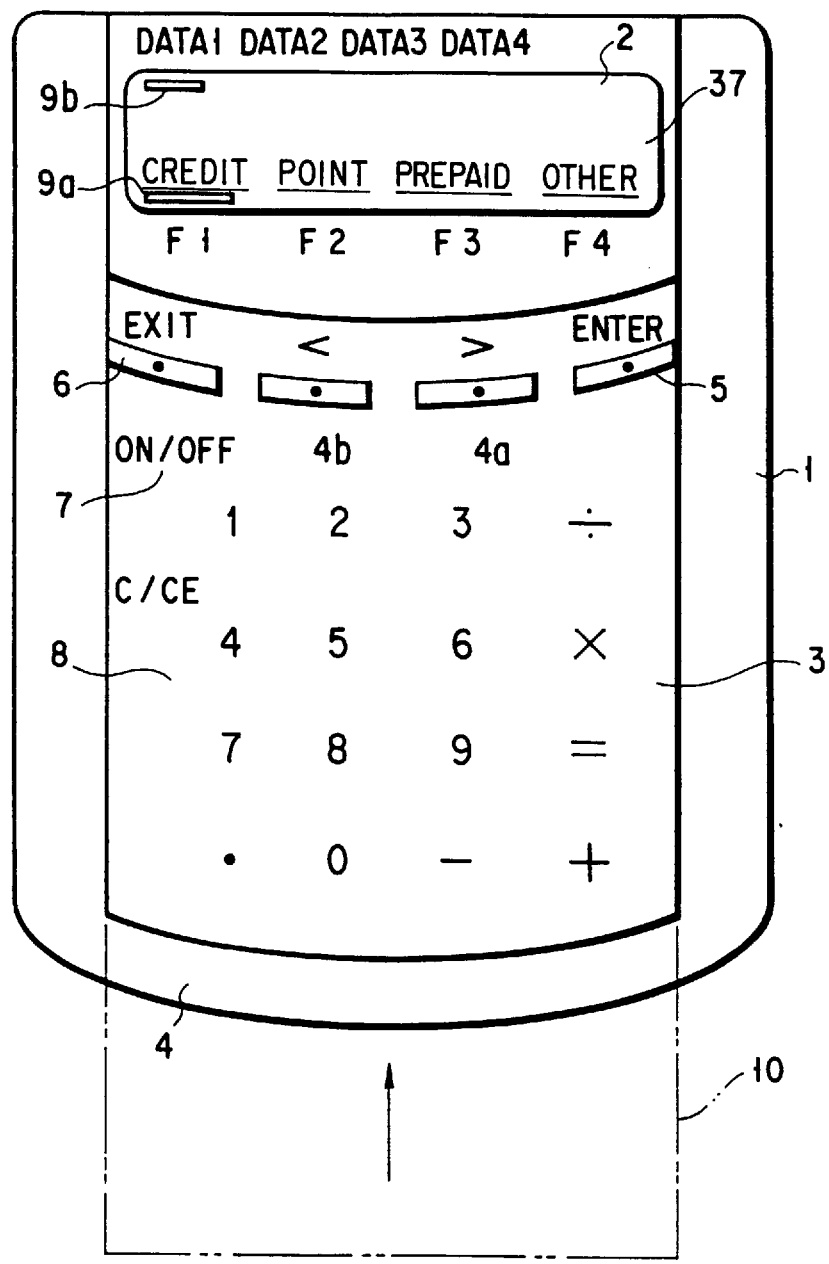
F I G. 1

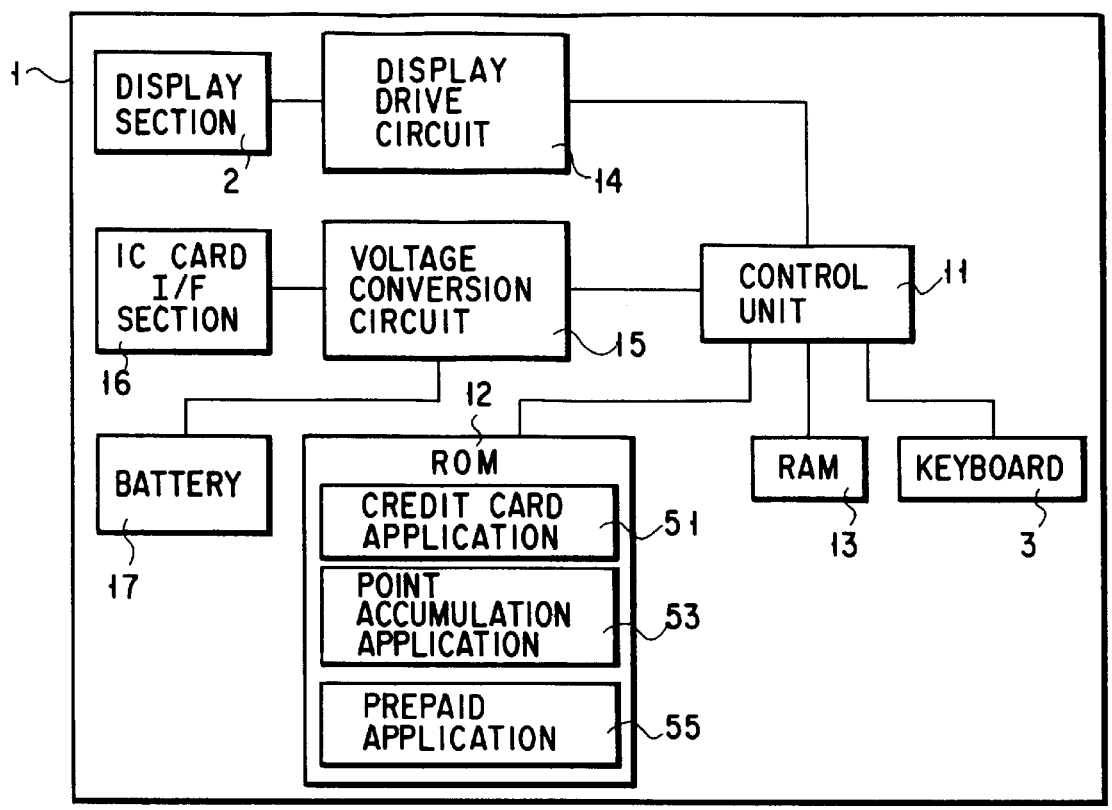
F I G. 2
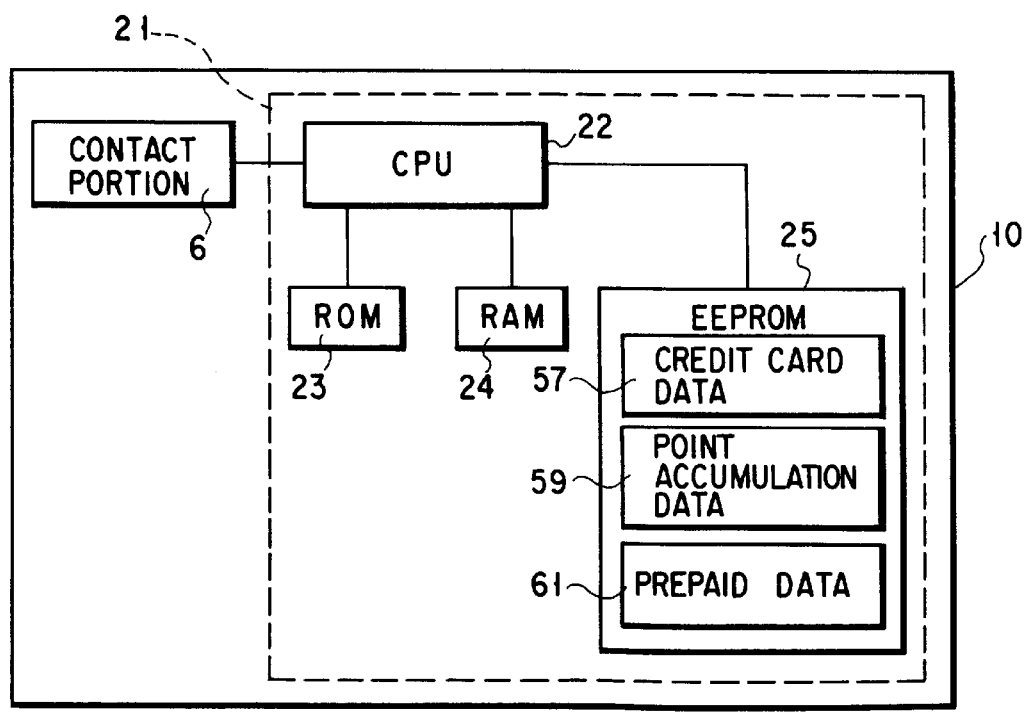
F I G. 3

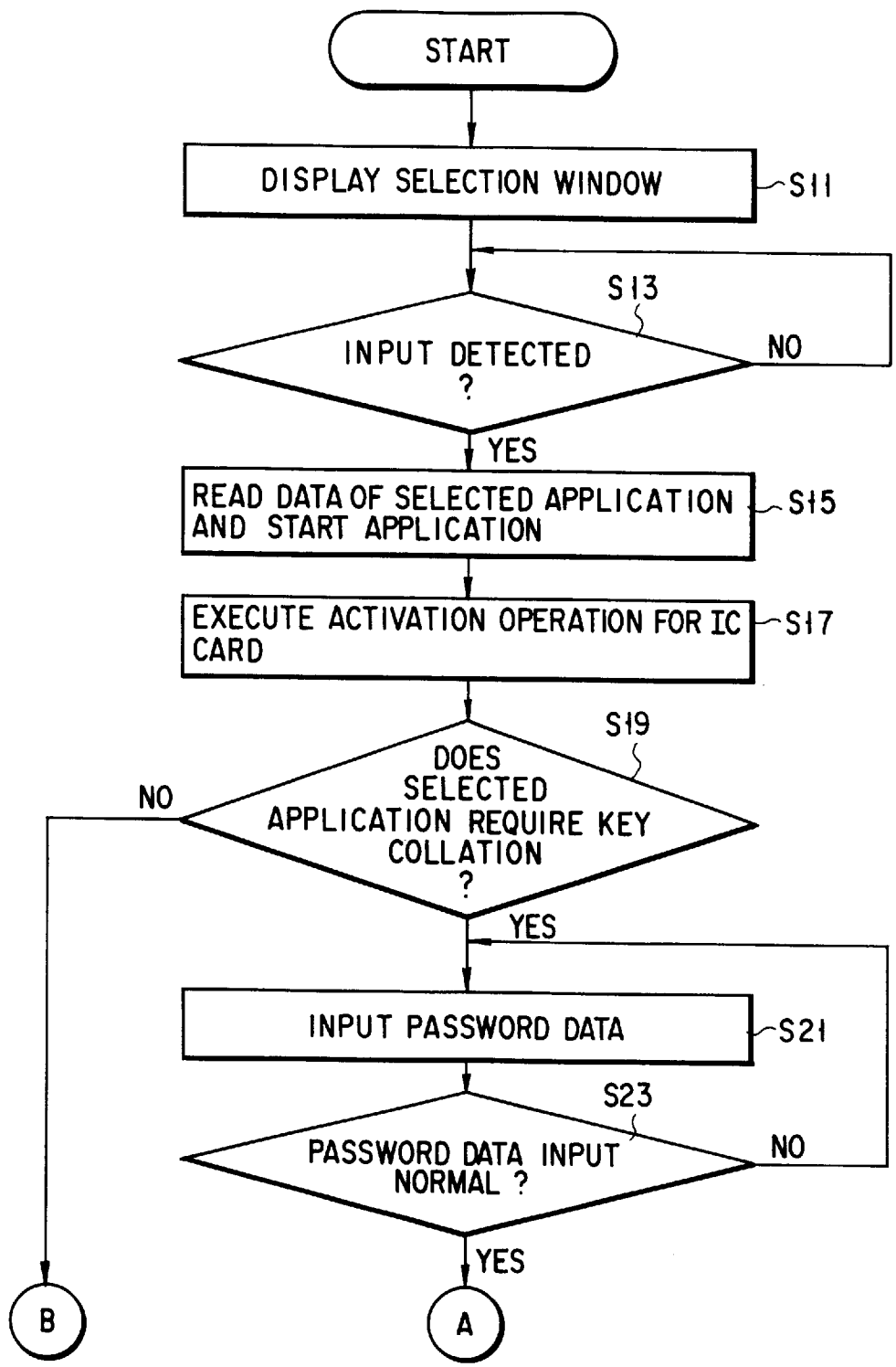
F I G. 4A

| APPLICATION | KEY COLLATION |
|---|---|
| CREDIT CARD | NECESSARY |
| POINT ACCUMULATION | NECESSARY |
| PREPAID | UNNECESSARY |

F I G. 5

PORTABLE TERMINAL APPARATUS FOR IC CARD COMPATIBLE WITH A PLURALITY OF APPLICATIONS

BACKGROUND OF THE INVENTION

The present invention relates to a portable terminal apparatus for an IC card which selectively reads and displays various transaction data, amount data, and the like from an IC card used as, e.g., a credit card and electronic money and supporting a plurality of applications.

In recent years, IC cards which incorporate IC chips having nonvolatile memories and control elements such as CPUs (Central Processing Units) for controlling the memories have been utilized as portable storage media in various industrial fields.

When an IC card of this type is used as, e.g., a credit card and electronic money, it is very convenient to selectively read and display various transaction data, amount data, and the like stored in the IC card, as needed.

For this purpose, a portable terminal apparatus for an IC card that the user can always carry has recently been developed. This portable terminal apparatus for an IC card is formed into a card-like shape, similar to the IC card, and comprises a keyboard, a liquid crystal display section, and a battery for a self-operation and a power supply of the IC card. Upon insertion of the IC card, various transaction data, amount data, and the like are selectively read from the IC card in accordance with a keyboard operation, and displays them on the liquid crystal display section.

Conventionally, such a portable terminal apparatus for an IC card copes with only a single application.

Since the above-mentioned conventional portable terminal apparatus for an IC card copes with only a single application, when data are to be read from an IC card which supports a plurality of applications, dedicated portable terminal apparatuses for an IC card are required for the respective applications.

When data are to be read from the IC card, it is impossible to determine whether key collation is necessary to read the data.

BRIEF SUMMARY OF THE INVENTION

It is an object of the present invention to provide a portable terminal apparatus for an IC card which is compatible with a plurality of applications and can automatically determine whether key collation is necessary in reading data from the IC card.

According to the present invention, there is provided a data processing apparatus for an integrated circuit medium, comprising: means for receiving and accessing the integrated circuit medium storing data; first processing means for performing data processing for the integrated circuit medium on the basis of a first application; second processing means for performing data processing for the integrated circuit medium on the basis of a second application different from the first application; means for inputting an instruction concerning data processing of the integrated circuit medium; means for selecting one of the first processing means and the second processing means in accordance with the instruction input from the input means; and means for controlling one of the first processing means and the second processing means which is selected by the selecting means so as to perform data processing.

With the above arrangement, the present invention provides a portable terminal apparatus which is compatible with a plurality of applications, unlike a conventional apparatus for a single application. Therefore, as for a recent IC card for a plurality of applications (e.g., a credit card, point accumulation, and a prepaid card), data can be read/written from/in the medium by only one portable terminal apparatus, instead of using conventional portable terminal apparatuses dedicated for the respective applications.

That is, the cardholder can call the application of, e.g., a prepaid card and confirm the outstanding balance of the prepaid card by selecting the application from the keyboard section of the portable terminal apparatus. Thereafter, the cardholder or user can call the application of a credit card by a selection operation from the keyboard section and confirm the credit card outstanding balance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a perspective view schematically showing the outer appearances of a portable terminal apparatus for an IC card and an IC card according to an embodiment of the present invention;

FIG. 2 is a block diagram schematically showing the arrangement of the portable terminal apparatus for an IC card;

FIG. 3 is a block diagram schematically showing the arrangement of the IC card;

FIGS. 4A and 4B are flow charts for explaining the read operation of data from the IC card; and FIG. 5 is a table showing the contents of a key collation table for determining whether key collation is necessary.

DETAILED DESCRIPTION OF THE INVENTION

Figure 4B:
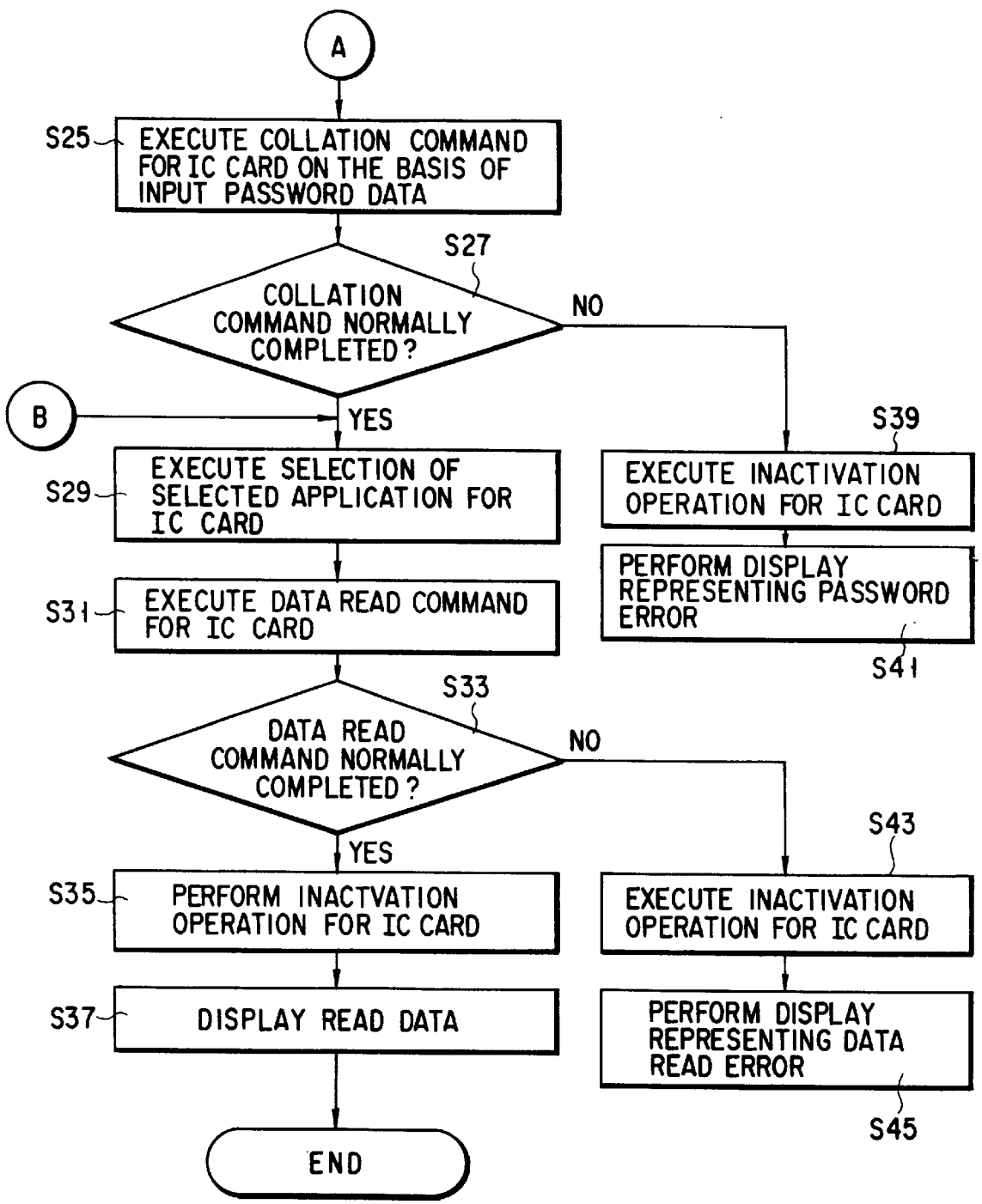

An embodiment of the present invention will be described below with reference to the accompanying drawings.

FIG. 1 schematically shows the outer appearances of a portable terminal apparatus for an IC card and an IC card according to this embodiment. More specifically, a portable terminal apparatus 1 for an IC card is formed into a card-like shape. One surface of the portable terminal apparatus 1 has a liquid crystal display section 2 serving as a display means for displaying various data, and a keyboard 3 serving as an input means for inputting password data and other data. One side surface of the portable terminal apparatus 1 for an IC card has a card slot portion 4 in which an IC card 10 is inserted and set.

The keyboard 3 includes an upward selection key 4a, a downward selection key 4b, an enter key (determination key) 5, an exit key 6 which is depressed when the current display is advanced to the next one, a power supply ON/OFF key 7, a ten-key pad 8, and the like. The selection keys 4a and 4b are keys for selecting one of a plurality of applications displayed on the liquid crystal display section 2, i.e., "credit card" 31, "point accumulation" 33, "prepaid" 35, and "other" 37 or for selecting data to be read by moving cursors 9a and 9b displayed on the liquid crystal display section 2.

The IC card 10 supports a plurality of applications such as a credit card, a point accumulation function, and a prepaid card, and a contact portion 6 (see FIG. 3) to be electrically connected to the interface section of the portable terminal apparatus 1 for an IC card is arranged at a predetermined portion on one surface.

FIG. 2 schematically shows the arrangement of the portable terminal apparatus 1 for an IC card. More specifically, a control unit 11 for performing overall control is mainly constituted by a CPU and the like. The control unit 11 is connected to a ROM (Read-Only Memory) 12 storing control programs and the like, a RAM (Read Access Memory) 13 serving as a storage means used as a work memory, a display drive circuit 14 for controlling and driving the display section 2, a voltage conversion circuit 15 for driving an IC card, and the keyboard 3.

The voltage conversion circuit 15 is connected to an IC card interface (I/F) section 16 serving as an interface means for exchanging a signal with the IC card 10 via the contact portion 6, and a battery 17 serving as a power supply section. In this embodiment, a battery having an output voltage of, e.g., 3 V is used as the battery 17.

The voltage conversion circuit 15 converts the power supply and signal voltages of the IC card I/F section 16 from a low voltage (+3 V) as the output voltage of the battery 17 into a specific voltage (+5 V) for an IC card.

FIG. 3 schematically shows the arrangement of the IC card 10. More specifically, the IC card 10 is constituted by the contact portion 6 and an IC chip 21. The IC chip 21 has a CPU 22 serving as a control element, a ROM 23 storing the control programs of the CPU 22, a RAM 24 serving as a work memory, an EEPROM 25 serving as a nonvolatile memory for storing data, and the like.

The EEPROM 25 stores data 57 for the credit card, data 59 for point accumulation, data 61 for the prepaid card, and the like. That is, the IC card is compatible with a plurality of applications and exhibits a plurality of functions by external instructions.

Next, the read operation of data from the IC card 10 in the above arrangement will be explained with reference to flow charts shown in FIGS. 4A and 4B. When data in the IC card 10 is to be read, the IC card 10 is inserted and set in the card slot portion 4. First, a plurality of applications 31, 33, 35, and 37 as shown in FIG. 1 are displayed on the selection window 2 (S11). A desired application is selected by the application selection keys 4a and 4b in the keyboard 3, the cursor 9a is moved to the application display 31, 33, 35, or 37 to be selected, and the determination key is depressed to determine the desired application (S13). Data of the selected application are read out from the EEPROM 25 of the IC card 10 to start this application (S15). Upon depression of the determination key, the control unit 11 performs an activation operation for the IC card 10 (S17) to wait for initial response data from the IC card 10.

If the initial response data from the IC card 10 are normally received, the control unit 11 refers to data in a key collation table shown in FIG. 5 to determine whether the selected application requires key collation (S19). The key collation table of FIG. 5 is stored in the ROM 12. Data representing whether each of a plurality of applications supported by the IC card 10 requires key collation are registered in the key collation table.

If key collation is required as a result of the above determination, the control unit 11 displays a prompt for of inputting a password on the display section 2. When password data (e.g., a password number) for key collation is input from the keyboard 3 (S21), and the control unit 11 determines that the password data is normally input (S23), the control unit 11 executes a key collation command for the IC card 10 on the basis of the input password data to perform key collation processing (collation of password data) in the IC card 10 (S25).

If an error occurs in this key collation processing (S27), the control unit 11 performs an inactivation operation for the IC card 10 (S39) to display a message representing a password error on the display section 2 (S41).

When the key collation processing is normally completed, or when key collation is unnecessary as a result of the above determination (S27), the control unit 11 performs selection processing of the application having selected for the IC card 10 (S29), and executes a data read command for the application (S31). With this processing, data of the selected application are read out from the EEPROM 25 of the IC card 10 and stored in the RAM 13.

When an error occurs in this read processing (S33), the control unit 11 executes an inactivation operation for the IC card 10 (S43). The control unit 11 displays a message representing a data read error on the display section 2 (S45).

On the other hand, when the readout processing is normally completed (S33), the control unit 11 executes an inactivation operation for the IC card 10 (S35). Thereafter, the control unit 11 displays on the display section 2 data which is read from the IC card 10 and stored in the RAM 13 (S37).

Note that when the selected application is "credit card", a plurality of credit card transaction results are read from the IC card 10 in the read processing and temporarily stored in the RAM 13, and a selection operation is performed (upward and downward keys are operated) with the keyboard 3. With this operation, data in the RAM 13 are sequentially read out and displayed on the display section 2.

When the selected application is "point accumulation", a service point based on the amount of purchase or the like is input from the keyboard 3 by the operation of a store clerk, and the input point is stored in the IC card 10. Further, when the selected application is "prepaid", the outstanding balance is read from the IC card 10 and temporarily stored in the RAM 13, and the data in the RAM 13 are read out and displayed on the display section 2.

In some cases, by performing a predetermined key operation with the keyboard 3, a calculation based on a specific algorithm is performed for data in the RAM 13 to display the calculation result on the display section 2.

As has been described above, according to the present invention, since the portable terminal apparatus for an IC card has a function of arbitrarily selecting a plurality of applications supported by the IC card, only one apparatus is compatible with a plurality of applications. Therefore, only one portable terminal apparatus for an IC card is compatible with respective applications which conventionally require dedicated apparatuses, resulting in an improvement in portability.

In addition, according to the present invention, the portable terminal apparatus can automatically determine whether key collation is necessary in reading data from an IC card. When key collation is necessary, data are read and displayed upon completion of key collation; and when key collation is unnecessary, data are immediately read and displayed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A data processing apparatus for an integrated circuit medium, comprising:

means for receiving and accessing the integrated circuit medium storing data;

first processing means for performing data processing for the integrated circuit medium on the basis of a first application;

second processing means for performing data processing for the integrated circuit medium on the basis of a second application different from the first application;

means for inputting an instruction concerning data processing of the integrated circuit medium;

means for selecting one of the first processing means and the second processing means in accordance with the instruction input from the inputting means; and means for controlling one of the first processing means and the second processing means which is selected by the selecting means so as to perform data processing.

2. An apparatus according to claim 1, further comprising:

means for storing necessity/nonnecessity data concerning necessity/nonnecessity of key collation in correspondence with one of the first application and the second applications; and means for determining whether the key collation is necessary by reading the necessity/nonnecessity data corresponding to one of the first and second applications which is selected by the selection means.

3. An apparatus according to claim 2, wherein the determining means includes:

means for displaying a message which causes an operator to input data for the key collation when the determinating means determines that the key collation is necessary; and third processing means for performing processing on the basis of the selected one of the first application and the second application when the determining means determines that the key collation is unnecessary.

4. An apparatus according to claim 3, wherein the third processing means includes:

means for reading and displaying data of the integrated circuit medium.

5. An apparatus according to claim 2, further comprising:

collation means for executing the key collation by comparing predetermined data with the input data when the determinating means determines that the key collation is necessary, and data for the key collation is input;

means for reading and displaying data corresponding to the selected one of the first application and the second application of the integrated circuit medium when a result of the collation means is determined to be normal; and means for displaying an error when the result of the collation means is determined to be abnormal.

6. An apparatus according to claim 1, further comprising:

third processing means for performing data processing for the integrated circuit medium on the basis of at least one third application different from the first and second applications;

means for selecting one of the first, second, and third processing means in accordance with the instruction input from the inputting means; and means for controlling one of the first, second, and third processing means which is selected by the selecting means so as to perform data processing.

7. An apparatus according to claim 6, wherein the first processing means includes:

means for performing data processing for the integrated circuit medium on the basis of an application concerning a credit card, the second processing means includes:

means for performing data processing for the integrated circuit medium on the basis of an application concerning point accumulation, and the third processing means includes:

means for performing data processing for the integrated circuit medium on the basis of an application concerning a prepaid card.

8. An apparatus according to claim 3, wherein the first processing means and the second processing means include respectively:

means for performing a data read operation and a data write operation on the basis of an application selected for the integrated circuit medium; and means for displaying the read data.

9. A data processing apparatus for an integrated circuit medium, comprising:

means for receiving and accessing the integrated circuit medium storing data;

first processing means for performing data processing for the integrated circuit medium on the basis of a first application;

second processing means for performing data processing for the integrated circuit medium on the basis of a second application different from the first application;

third processing means for performing data processing for the integrated circuit medium on the basis of at least one third application different from the first and second applications;

means for inputting an instruction concerning data processing of the integrated circuit medium;

means for selecting one of the first, second, and third processing means in accordance with the instruction input from the inputting means;

means for controlling one of the first, second, and third processing means which is selected by the selecting means so as to perform data processing;

means for storing necessity/nonnecessity data concerning necessity/nonnecessity of key collation in correspondence with one of the first, second, and third applications;

means for determining whether the key collation is necessary by reading the necessity/nonnecessity data corresponding to one of the first, second, and third applications which is selected by the selecting means;

means for displaying a message which causes an operator to input data for the key collation when the determining means determines that the key collation is necessary; and means for reading and displaying data of the integrated circuit medium on the basis of the selected one of the first, second, and third applications when the determining means determines that the key collation is unnecessary.

10. A portable terminal apparatus, receives an IC card storing data every a plurality of applications, reads the data from the received IC card and displays the read data, comprising:

means for selecting one of the plurality of applications;

means for determining whether key collation is necessary or not for data reading of the selected application after the selecting means selected one of the plurality of applications;

means for inputting a password data for the key collation to the IC card when the determining means determines that the key collation is necessary;

means for controlling the IC card so as to perform the key collation on the basis of the input password by the inputting means;

means for reading the data of the selected application from the received IC card, when the key collation of the controlling means judged as being right or the determining means determined that the key collation is unnecessary; and means for displaying the read data by the reading means.

11. An apparatus according to claim 10, further comprising:

means for storing necessity/nonnecessity data concerning necessity/nonnecessity of key collation in correspondence with one of a first application and a second applications; and means for determining whether the key collation is necessary by reading the necessity/nonnecessity data corresponding to one of the first and second applications which is selected.

* * * * *